US008036063B2

(12) United States Patent
Smith et al.

(10) Patent No.: US 8,036,063 B2
(45) Date of Patent: Oct. 11, 2011

(54) SYSTEM AND METHOD FOR AUTOMATIC SENSITIVITY ADJUSTMENT OF AN ACOUSTIC DETECTOR

(75) Inventors: Richard A. Smith, El Dorado Hills, CA (US); Tom R. Petek, Sacramento, CA (US)

(73) Assignee: Honeywell International Inc., Morristown, NJ (US)

( * ) Notice: Subject to any disclaimer, the term of this patent is extended or adjusted under 35 U.S.C. 154(b) by 558 days.

(21) Appl. No.: 11/835,763

(22) Filed: Aug. 8, 2007

(65) Prior Publication Data

US 2009/0040869 A1 Feb. 12, 2009

(51) Int. Cl.
*H04B 17/00* (2006.01)

(52) U.S. Cl. .......................................... 367/13; 73/1.82

(58) Field of Classification Search .................... 367/13; 73/1.82

See application file for complete search history.

(56) References Cited

U.S. PATENT DOCUMENTS

| | | | | |
|---|---|---|---|---|
| 5,341,122 | A | 8/1994 | Rickman | |
| 5,524,099 | A | 6/1996 | Rickman et al. | |
| 6,028,505 | A * | 2/2000 | Drori | 340/426.17 |
| 6,351,214 | B2 * | 2/2002 | Eskildsen et al. | 340/550 |
| 2004/0140892 | A1 | 7/2004 | Hanood | |
| 2005/0128067 | A1 * | 6/2005 | Zakrewski | 340/511 |
| 2006/0147061 | A1 * | 7/2006 | Niwa et al. | 381/113 |

OTHER PUBLICATIONS

European Search Report for corresponding European Patent Application No. 08 15 1761 mailed Nov. 26, 2008.

* cited by examiner

*Primary Examiner* — Ian Lobo
(74) *Attorney, Agent, or Firm* — Husch Blackwell

(57) ABSTRACT

A method and system for automatically adjusting a sensitivity of an acoustic detector. The method comprises receiving an acoustic signal from a remote device, detecting the unique pattern embedded therein, changing a mode of operation based upon the detection, measuring a voltage created by the reception of the acoustic signal and adjusting the sensitivity of the acoustic detector based upon a measured voltage. The acoustic signal contains a unique pattern indicative of the remote device.

10 Claims, 2 Drawing Sheets

SYSTEM AND METHOD FOR AUTOMATIC SENSITIVITY ADJUSTMENT OF AN ACOUSTIC DETECTOR

FIELD OF THE INVENTION

The invention relates to security systems, communication systems and acoustic detectors. More particularly, the invention relates to a method and system for automatically adjusting the sensitivity of an acoustic sensor.

BACKGROUND

Acoustic detectors are commonly used to detect and indicate attempts to break into premises. The most common acoustic detector is a glass breakage detector. The detector generates an alarm signal when the sound of a breaking window is detected. Typically, the detectors are remotely mounted from the protected glass and are attached to a ceiling or a wall. The location of the detector is dependent on the size of the protected area and a number of other mounting restrictions that are manufacturer specific.

The detectors rely on detecting the sound of breaking glass by sensing one or more known frequency components associated with the sound of breaking glass. When the glass breakage detector is installed, it is typically tested to ensure proper functionality. Additionally, it is tested to customize the detector for a given location, such that acoustic properties of the proximate environment are compensated for by a sensitivity adjustment to optimize the sensing range of the detector. Various common objects found in an indoor location can affect the performance of the detector, such as carpet, ceiling tiles, walls and/or floors, due to the reflection and absorption of frequency components.

To test the detectors, a glass break simulator is used to simulate the glass breakage. For example, U.S. Pat. No. 5,341,122 describes a glass breakage simulator capable of generating different frequency components indicative of broken glass. However, to adjust the level of sensitivity of the detector, an installer needs to open the detector each time the level must be changed. In practice, the sensitivity adjustment can occur several times, requiring the installer to manually adjust the sensitivity each time by changing a switch setting inside the detector. Since each installation is different, the installer would have to climb a ladder and open the detector multiple times before achieving the proper sensitivity level. This adjustment process is time consuming and cumbersome. Because the process is cumbersome, installers will often not optimize the range for the given site, leading to a less than ideal installation.

Accordingly, there is a need to be able to test the detector and adjust the sensitivity of the detector without requiring substantial effort by an installer.

SUMMARY OF THE INVENTION

Disclosed is a method for automatically adjusting the sensitivity level of an acoustic detector by transmitting an acoustic signal to the acoustic detector. The acoustic detector determines at least one acoustic property of the signal and automatically optimizes the sensitivity of the sensor for a given range based upon the properties.

The method comprises the steps of receiving an acoustic signal from a remote device; detecting a unique pattern embedded in the signal; changing a mode of operation after detection of the unique pattern; measuring a voltage created by the reception of the acoustic signal, and adjusting the sensitivity of the acoustic detector based upon the measured voltage. The acoustic signal contains a unique pattern indicative of a calibration device.

The mode of operation is changed to a setting or test mode if the unique pattern in the acoustic signal matches a stored key signature in the acoustic detector.

The method also includes a step of converting the acoustic signal into a digital signal for processing and measuring.

The voltage is measured over a predetermined time period. The time period is the same time period used for glass break detection.

The voltage can be measured as a peak voltage or an average voltage within the predetermined time.

The measured voltage is compared with voltage threshold ranges, which are stored in the detector. Each sensitivity level has a corresponding voltage threshold range. The acoustic detector sets the sensitivity level to a sensitivity level that corresponds with the voltage threshold range that contains the measured voltage value.

Also disclosed is an acoustic detector adapted for automatically adjusting its sensitivity based upon the receipt of a calibration signal. The acoustic detector comprises an acoustic sensor for detecting an acoustic signal, an acoustic signal determining section for examining the acoustic signal for a unique signature indicative of a calibration device, a mode selection section for setting a test mode based upon the examination, an analog-to-digital converter for sampling the acoustic signal, a voltage measuring section for determining a voltage level of the sampled signal and an adjustment section for adjusting a sensitivity of the acoustic detector based upon the measured voltage level.

The measured voltage level can be a peak voltage or average voltage within a predetermined time period.

The acoustic detector also includes a comparison section for comparing the measured voltage level with a plurality voltage ranges. Each range corresponds to a sensitivity level of the detector The adjustment section sets a sensitivity level that corresponds to the voltage ranges that has the measured voltage level within the voltage ranges.

Further disclosed is a system for adjusting a sensitivity of an acoustic detector. The system includes a calibration device and an acoustic detector. The calibration device is adapted for transmitting an acoustic calibration signal to a acoustic detector in response to user input. The acoustic calibration signal includes an unique signature indicative of the calibration device.

The acoustic detector is adapted for receiving the acoustic calibration signal from the calibration device, detecting the unique signature, measuring a voltage created by the reception of the acoustic calibration signal if the unique signature is detected; and adjusting a sensitivity of the acoustic detector based upon the measured voltage of the acoustic calibration signal.

BRIEF DESCRIPTION OF THE DRAWINGS

These and other features, benefits and advantages of the present invention will become apparent by reference to the following text figures, with like reference numbers referring to like structures across the views, wherein.

DETAILED DESCRIPTION OF THE INVENTION

Figure 1:
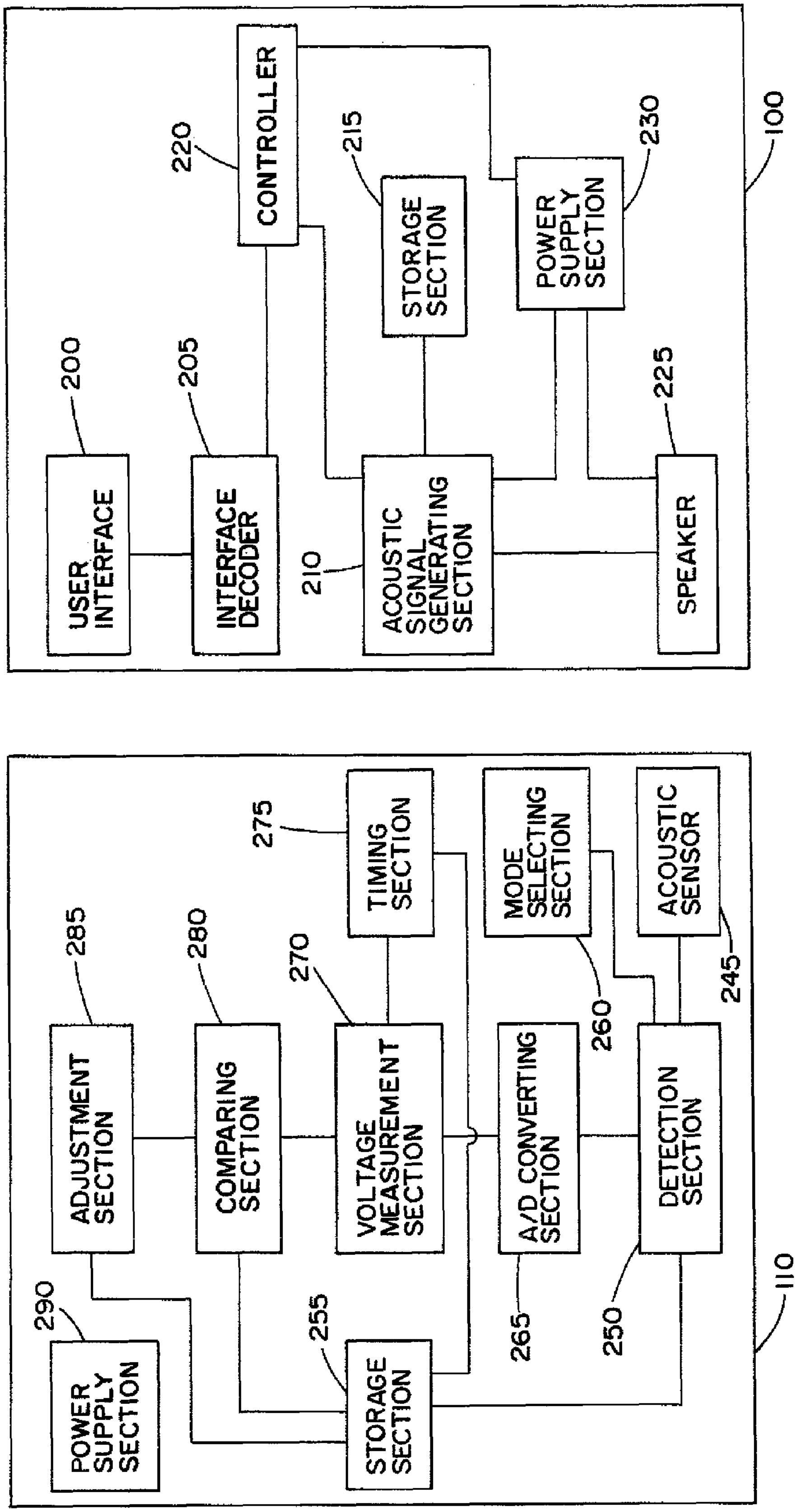
FIG. 1 illustrates a basic diagram of the automatic adjustment system of the invention including a block diagram of a calibration device and a block diagram of an acoustic detector.

FIG. 1 illustrates the adjustment system of the invention in which a calibration device 100 is used to adjust the sensitivity of an acoustic detector 110. The calibration device 100 can be any device capable of transmitting a calibrated acoustic signal. In one embodiment, the calibration device 100 is a glass breakage simulator. For example, the calibration device 100 can be the glass breakage simulator as described in U.S. Pat. No. 5,341,122 issued to Stephen Rickman, which is hereby incorporated by reference.

The calibration device 100 includes a user interface 200 adapted to allow a user to input data into the calibration device 100, control the functionality of the calibration device 100 and send signals to the acoustic detector 110. In the preferred embodiment, the user interface 200 will include a plurality of push buttons, each push button corresponding to a function of the calibration device 100. For example, one push button can be used to trigger the calibration device 100 to transmit an acoustic signal to the acoustic detector 110. The acoustic signal acts as a test signal. Additionally, according to the invention, the acoustic signal will be used by the acoustic detector 110 to automatically adjust the sensitivity. Alternatively, the user interface 200 can be an alphanumeric keypad.

The calibration device 100 also includes an interface decoder 205. The interface decoder 205 is coupled to the user interface 200 to detect and decode the user input.

The calibration device 100 also includes an acoustic signal generating section 210, storage section 215 and a controller 220. The acoustic signal generator section 210 generates a predefined acoustic signal based upon the user input detected by the interface decoder 205. The storage section 215 is used to store data. For example, the storage section 215 can include a digitized acoustic signal. In one embodiment, the storage section 215 is non-volatile memory. In the preferred embodiment, the controller 220 can be a microcontroller programmed with firmware or other control instructions. In another embodiment, the controller 220 can be an ASIC. In another embodiment of the invention, the acoustic signal generating section 210, storage section 215 and interface decoder 205 can be implemented in the controller 220.

In one embodiment, the acoustic signal or test signal is a predefined digitized signal stored in the storage section 215. The acoustic signal includes a unique pattern of pulses and spaces. The unique pattern acts as a unique key signature for the calibration device 100 and can be used by the acoustic detector 110 to determine the origin of the signal and determine if the signal is a test signal from a calibration device 100. If a predefined digitized signal is used, the acoustic signal generating section 210 retrieves the signal from the storage section 215 and relays the acoustic signal to a speaker 225. The speaker 225 is used to transmit the acoustic signal to the acoustic detector 110. The acoustic signal generation section 210 will amplify the acoustic signal for transmission. The amplification amount is controlled such that the transmission power is kept constant, i.e., the peaks and average voltage level are factory set values. The acoustic signal is a series of spaced-apart pulses encoded by a relative inter pulsed timing of spaced apart pulses.

In another embodiment of the invention, the acoustic signal generating section 210 creates the acoustic signal based upon instructions stored in the storage section. The storage section includes information regarding the relative timings. In this embodiment, the acoustic signal generating section 210 includes an oscillator, modulator and an amplifier. The signal generated by the oscillator will be added with the pulses and timings from the storage section 215 and modulated to create the acoustic signal. The specific timings and pulses stored in the storage section 215 are used as the unique key signature.

The calibration device 100 includes a power supply 230. The power supply can be a battery.

The acoustic detector 110 includes an acoustic sensor 245, detection section 250, a storage section 255, a mode selecting section 260, an A/D converting section 265, a voltage measurement section 270, a timing section 275, a comparing section 280, an adjustment section 285 and a power supply device 290. While the detection section 250, the storage section 255, the mode selecting section 260, the A/D converting section 265, the voltage measurement section 270, the timing section 275, the comparing section 280, and the adjustment section 285 have been illustrated as being separate sections, these sections can be combined and the functionality implemented by a microprocessor programmed with firmware, a programmable array of logic gates or an ASIC.

The acoustic sensor 245 can be a microphone. The acoustic sensor 245 senses the acoustic signal from the calibration device 100.

Initial processing of the acoustic signal is performed by the detection section 250. The detection section 250 detects the unique key signature embedded in the acoustic signal, e.g. unique pattern. The detection section will determine the unique pattern of the acoustic signal and compare the received pattern with a stored pattern from the storage section 255. A unique pattern corresponding to the calibration device 100 is stored in the storage section 255.

The detection section 250 forwards the result of the comparison to the mode selecting section 260. The mode selecting section 260 can be either a "test/set mode" for the acoustic detector 110 or an "alarm/monitor" mode. The "test/set mode" is used during the installation and the "alarm/monitor" mode is used during normal operation of the acoustic detector 110. If the unique pattern of the received acoustic signal matches the pattern stored in the storage section 255, i.e., by signature of the calibration device 100, the mode selecting section 260 selects "test/set mode" and the acoustic detector 110 will act in the test/set mode.

Additionally, the detection section 250 forwards the acoustic signal to the A/D converting section 265.

The A/D converting section 265 converts the received analog acoustic signal into a digital representation. The A/D converting section 265 uses a preset sampling rate and will generate "N" samples. For each sample, the A/D converting section 265, will output an "M" bit signal. The "M" bit signal defines a number of discrete values or voltage levels. The number of bits "M" is predetermined.

The "M" bit signal is output to the voltage measuring section 270. The voltage measuring section 270 determines at least one voltage characteristic of the digital representation of the received acoustic signal within a predetermined time period. The voltage characteristic of the signal can be a peak value within the predetermined time period. Additionally, the voltage characteristic of the signal can be the average voltage value within the predetermined time period.

The predetermined time period is stored in the storage section 255. In the preferred embodiment, the predetermined time period is a short period of time. The time is short enough to render any unwanted reflection inconsequental to the detection result. The time period is typically equal to the time period used in an active mode to detect a glassbreak.

A timing section 275 counts the predetermined time period. The timing section 275 retrieves the predetermined time period from the storage section 255.

The comparing section 280 compares the measured at least one voltage characteristic with the corresponding stored voltage characteristic from the storage section 255.

The stored voltage characteristic acts a voltage threshold for a particular sensitivity level. The voltage threshold is a range of voltage values used to set the sensitivity level. For example, if the measured voltage value is between “A” and “B” voltage, the sensitivity level should be set to level “Z”.

The voltage threshold can define a peak voltage range or an average voltage range. In another embodiment, both a peak voltage range and an average voltage range can be used for the voltage threshold. The voltage threshold is stored in the storage section 255 as a look up table. Each sensitivity level has at least one voltage threshold.

The adjustment section 285 adjusts the sensitivity of the acoustic detector 110 based upon the output of the comparing section 280. The comparing section 280 outputs the sensitivity level that matches the measured voltage. The adjustment section 285 changes a detection threshold for the acoustic detector 110.

The power supply section 290 powers the acoustic detector 110. In one embodiment, the power supply section 290 is an internal battery. In another embodiment, the power supply section 290 receives power from an external power source such as from a wired connection with a security system.

Figure 2:
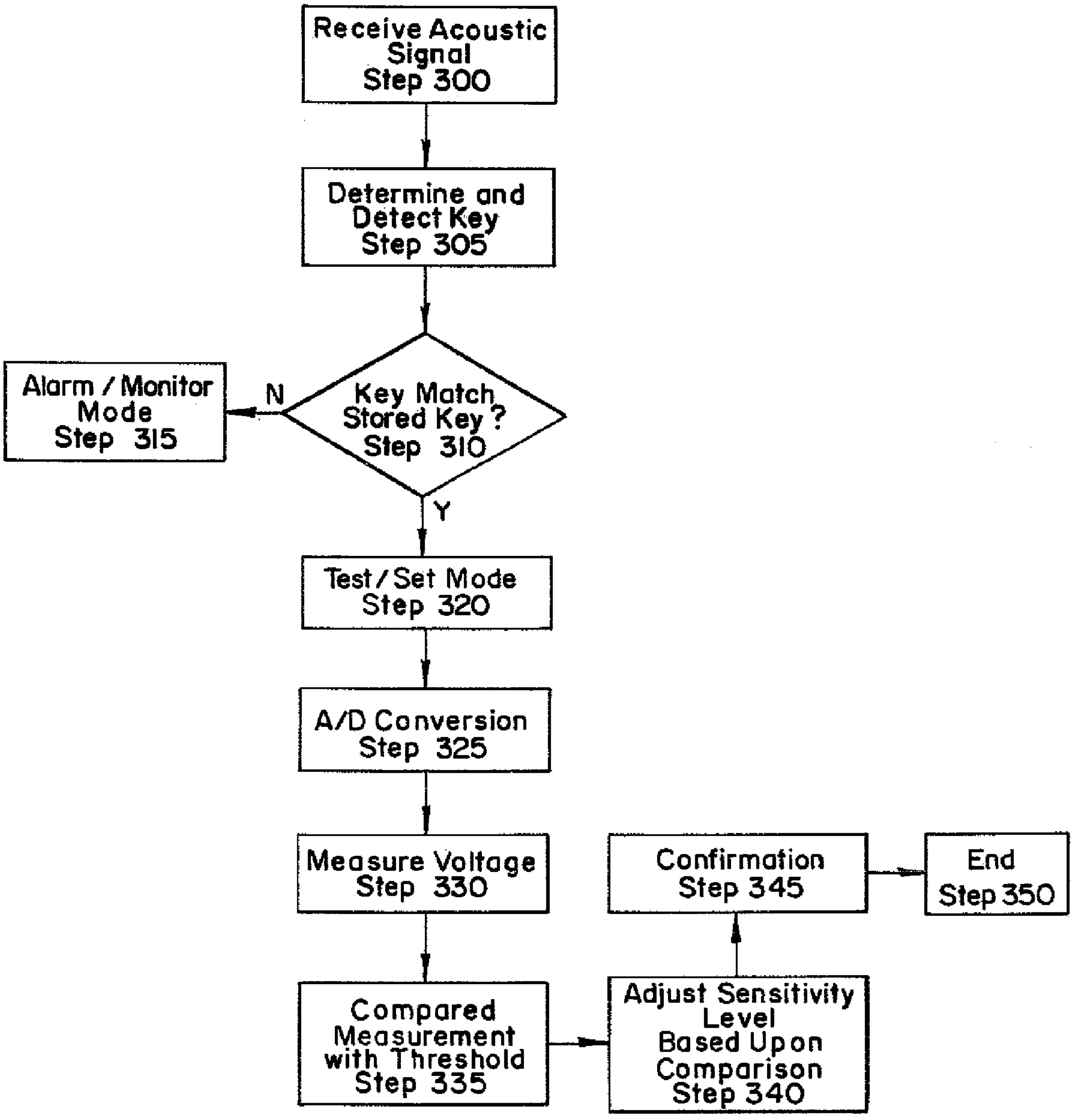
FIG. 2 illustrates a sensitivity adjustment method according to an embodiment of the invention.

FIG. 2 illustrates the automatic adjustment method according to an embodiment of the invention. During installation, an installer stands at the farthest portion of a glass window relative to the acoustic detector 110. The installer initiates the method by using the user interface 200, e.g., depressing a button. The calibration device 100 transmits an acoustic signal to the acoustic detector. The acoustic signal includes the unique key signature identifying the signal as coming from the calibration device. In an embodiment, the amplitude and frequency data is used both as the calibration signal and the unique key signature. The amplitude and timings of the pulses are temporarily stored in a buffer to allow for the identification first, and then for calibration.

At step 300, the acoustic detector 110 receives the acoustic signal. The acoustic sensor 245 or microphone detects the sound. Optionally, the acoustic detector 110 can acknowledge the acoustic signal. A notification device (not shown) acknowledges the acoustic signal. The acknowledgement can be in the form of a visual indication e.g., flashing lights. Alternatively, an audible acknowledgement can be used.

At step 305, the detection section 250 determines a unique key signature from the acoustic signal.

If the acoustic signal is a modulated signal, then the detection section 250 will demodulate the signal prior to determination of the unique key signature. Once the signal is demodulated, the determination method is the same. The detection section 250 determines the timings of the received pulses.

The detection section 250 recognizes a pulse if the acoustic signal exceeds the detection threshold. The detection threshold is used to determine whether an acoustic event has occurred. If the amplitude of a pulse is greater than the detection threshold, it is an event that will be evaluated by the detection section 250. When the amplitude of a pulse of the acoustic signal exceeds the threshold, a detection signal is generated. A timer determines the timing of the pulses and spaces based upon the timing of the detection signal. A timing pattern is generated from all of the detection signals. The timing pattern is compared with timings from the storage section 255 to determine if the detected key signature matches the stored key signature, at step 310.

If there is a match, the mode selecting section 260 changes the mode to test/set mode, at step 320. However, if there is no match, the mode remains in alarm/monitor mode, at step 315.

At step 325, the acoustic signal is converted from an analog signal to a digital representation of the signal. The A/D converting section 265 converts the acoustic signal into “N” samples, each being “M” bits. The value of the bits corresponds to various voltage levels. The A/D converting section 265 retrieves the values, “M” and “N” from the storage section 255.

At step 330, the voltage measuring section 270 determines at least one voltage characteristic of the converted digital signal within a predetermined time. For example, the voltage measuring section 270 determines the peak voltage value of the digital signal with the predetermined time. The peak voltage value corresponds to the sampled value that has the largest voltage level, i.e., larger “M” bit value. At step 330, the voltage measuring section 270 can also determine the average voltage value of the digital signal during the predetermined time. The voltage measuring section 270 will use the “M” bit value of each sample within the predetermined time and add the values together and divide by the number of samples. The timing section 275 retrieves the predetermined time from the storage section 255 and counts down the predetermined time period. During this time period, the voltage measuring section 270 determines the voltage values for each sample based upon the “M” bit value. The voltage measuring section 270 stops the determination once the predetermined time expires.

At step 335, the comparing section 280 compares the measured peak value and/or the average value with stored voltage thresholds from the storage section 255. For example, the measured peak value will be compared with the stored peak value threshold and the measured average value will be compared with the stored average value threshold. The comparing section 280 outputs the sensitivity level that corresponds to the threshold that the measured peak and/or average voltage values are within the range.

At step 340, the sensitivity adjustment section 285 adjusts the sensitivity level based upon the output from the comparing section 280. The sensitivity adjustment section 285 changes the detection threshold to a value that matches the new sensitivity level.

In the preferred embodiment, the new sensitivity level is confirmed at least once, at step 345. A unique signal is sent from the calibration device 100 to request a confirmation. The acoustic detector 110 responds to the signal by showing the current sensitivity level. The response can be a visual or audible response.

The control method according to the invention eliminates the need for any sensitivity switches in the acoustic detector 110.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method of automatically adjusting a sensitivity of an acoustic detector comprising:

a. receiving an acoustic signal from a remote device, said acoustic signal containing a unique pattern indicative of the remote device;

b. detecting the unique pattern;

c. changing a mode of operation after detection;

d. measuring at least one of a peak voltage value or an average voltage value within a predetermined period of time created by the reception of said acoustic signal;

e. comparing at least one of the measured peak voltage value or the measured average voltage value with a stored peak voltage value or a stored average voltage value; and f. adjusting the sensitivity of the acoustic detector based upon the comparison of the measured peak voltage value or the measured average voltage value with the stored peak voltage value or the stored average voltage value.

2. The method according to claim 1, further comprising the step of confirming the sensitivity adjustment.

3. The method according to claim 2, wherein the step of confirming includes receiving a confirmation signal from the remote device.

4. The method according to claim 1, wherein step (c) includes a sub-step of setting the acoustic detector in a test mode if a unique pattern detected corresponds to a stored pattern.

5. The method according to claim 1, wherein step (b) includes matching the unique pattern with a stored pattern.

6. The method according to claim 1, wherein step (d) includes the sub-steps of converting said acoustic signal into a digital signal; and measuring at least one of the peak voltage value or the average voltage value of the digital signal.

7. The method according to claim 1, wherein said predetermined period of time is sufficiently short to render any unwanted reflections negligible.

8. The method according to claim 1, further comprising the step of: matching said measured peak voltage value with one of a plurality of stored peak voltage threshold ranges, one stored peak voltage threshold range is associated with each sensitivity level and wherein step (f) includes setting the sensitivity to a sensitivity level that corresponds with the matched peak voltage threshold range.

9. The method according to claim 1, further comprising the step of: matching said measured average voltage value with one of a plurality of stored average voltage threshold ranges, one stored average voltage threshold range is associated with each sensitivity level and wherein step (f) includes setting the sensitivity to a sensitivity level that corresponds with the matched average voltage threshold range.

10. A system for adjusting a sensitivity of an acoustic detector comprising:

a calibration device adapted for transmitting an acoustic calibration signal to an acoustic detector in response to user input, said acoustic calibration signal including an unique signature indicative of said calibration device; and an acoustic detector adapted for receiving the acoustic calibration signal from the calibration device, detecting the unique signature, measuring at least one of a peak voltage value or an average voltage value within a predetermined period of time created by the reception of said acoustic calibration signal if the unique signature is detected; comparing at least one of the measured peak voltage value or the measured average voltage value with a peak voltage value or an average voltage value stored in the detector, and adjusting a sensitivity of the acoustic detector based upon the comparison of the measured peak voltage value or the measured average voltage value with the stored peak voltage value or the stored average voltage value.

* * * * *